United States Patent [19]
Wickert et al.

[11] Patent Number: 6,112,865
[45] Date of Patent: Sep. 5, 2000

[54] DAMPER FOR BRAKE NOISE REDUCTION (BRAKE DRUMS)

[75] Inventors: Jonathan A. Wickert, Allison Park; Adnan Akay, Sewickley, both of Pa.

[73] Assignee: Chrysler Corporation, Auburn Hills, Mich.

[21] Appl. No.: 08/907,872

[22] Filed: Aug. 11, 1997

Related U.S. Application Data

[63] Continuation-in-part of application No. 08/761,879, Dec. 9, 1996, Pat. No. 5,855,257.

[51] Int. Cl.⁷ .................................................. F16D 65/10
[52] U.S. Cl. ............................... 188/218 XL; 188/218 A
[58] Field of Search ....................... 188/218 XL, 218 A, 188/218 R; 74/574

[56] References Cited

U.S. PATENT DOCUMENTS

| | | |
|---|---|---|
| 1,745,301 | 1/1930 | Johnston . |
| 1,791,495 | 2/1931 | Frey . |
| 1,927,305 | 9/1933 | Campbell . |
| 1,946,101 | 2/1934 | Norton . |
| 2,012,838 | 8/1935 | Tilden . |
| 2,081,605 | 5/1937 | Sinclair . |
| 2,197,583 | 4/1940 | Koeppen et al. . |
| 2,410,195 | 10/1946 | Baselt et al. . |
| 2,506,823 | 5/1950 | Wyant . |
| 2,639,195 | 5/1953 | Bock . |
| 2,702,613 | 2/1955 | Walther, Sr. . |
| 2,764,260 | 9/1956 | Fleischman . |
| 2,897,925 | 8/1959 | Strohm . |
| 2,941,631 | 6/1960 | Fosberry et al. ................... 188/218 A |
| 3,250,349 | 5/1966 | Byrnes et al. . |
| 3,286,799 | 11/1966 | Shilton ................................ 188/218 A |
| 3,292,746 | 12/1966 | Robiette . |
| 3,368,654 | 2/1968 | Wegh et al. . |
| 3,435,925 | 4/1969 | Harrison . |
| 3,934,686 | 1/1976 | Stimson et al. . |
| 4,646,899 | 4/1987 | Contoyonis . |
| 5,004,078 | 4/1991 | Oono et al. . |
| 5,383,539 | 1/1995 | Bair et al. . |
| 5,855,257 | 1/1999 | Wickert et al. ................... 188/218 XL |

FOREIGN PATENT DOCUMENTS

| | | |
|---|---|---|
| 123707 | 7/1931 | Austria . |
| 0039076 | 3/1977 | Japan ................................ 188/218 A |
| 58-72735 | 4/1983 | Japan . |
| 63-308234 | 12/1988 | Japan . |
| 254561 | 7/1926 | United Kingdom ............... 188/218 A |
| 708083 | 10/1952 | United Kingdom . |
| 857043 | 12/1960 | United Kingdom ............... 188/218 A |
| 0934096 | 8/1963 | United Kingdom ............... 188/218 A |
| 2181199 | 4/1987 | United Kingdom . |
| 2181802 | 4/1987 | United Kingdom . |

Primary Examiner—Chris Schwartz
Attorney, Agent, or Firm—Roland A. Fuller, III

[57] ABSTRACT

An apparatus of reducing unwanted brake noise has a ring damper affixed around a periphery of brake drum in a drum brake system in a manner that permits relative motion and slippage between the ring damper and the brake drum when the brake drum vibrates during braking. In a preferred embodiment, the ring damper is an almost circular ring that is inserted in a groove formed in the periphery of the brake drum. The ring damper is held in place by the groove itself and by the interference pre-load or pre-tension between the ring damper and the brake drum.

11 Claims, 3 Drawing Sheets

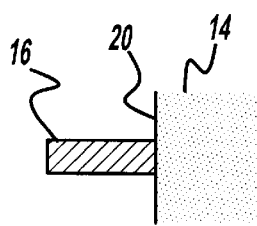
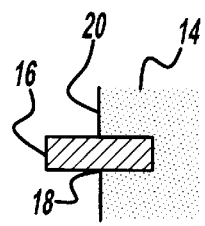
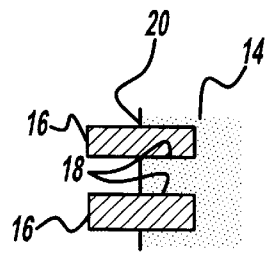
Figure - 4a     Figure - 4b     Figure - 4c
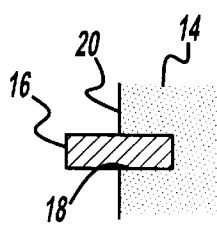
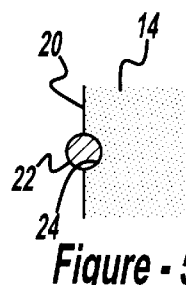
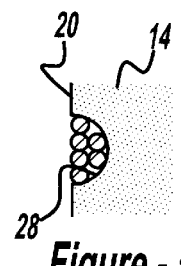
Figure - 5a     Figure - 5b     Figure - 5c
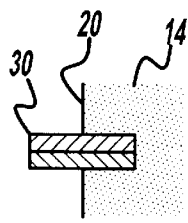
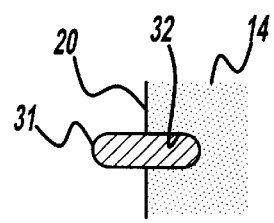
Figure - 5d     Figure - 5e
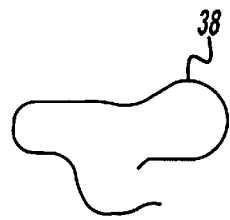
Figure - 6a     Figure - 6b     Figure - 6c
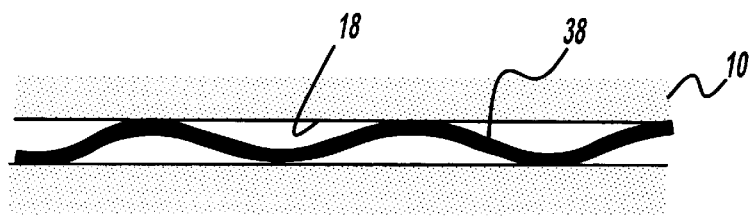
Figure - 7

DAMPER FOR BRAKE NOISE REDUCTION (BRAKE DRUMS)

This application is a continuation-in-part application of U.S. Ser. No. 08/761,879 U.S. Pat. No. 5,855,257 for a damper for brake noise reduction filed Dec. 9, 1996, which is incorporated herein by reference.

This invention relates to brake noise reduction, and more specifically, to the use of dampers affixed to to brake drums in drum brake systems to reduce brake noise during the braking process.

BACKGROUND

Drum brakes are commonly used in automobiles, trucks, buses, off-road and construction vehicles, and light rail vehicles. In a drum brake type of braking system, a drum that rotates with the vehicle's wheel surrounds a stationary brake shoe arrangement. When the brakes are applied, the brake shoes are pressed against the inner surface of the brake drum by wheel cylinders under high hydraulic pressure. The frictional forces between the shoes and drum bring the vehicle to a stop.

A common problem associated with brake systems is that unwanted noise and vibration are often generated during the braking process. This unwanted noise is a frequently recurring problem that causes numerous customer complaints and significant warranty expenditures on the part of motor vehicle manufacturers.

It is an object of this invention to reduce brake noise.

It is a further object of this invention to reduce unwanted brake noise by the use of a simple damping arrangement that minimizes the amount of additional forming operations required in the manufacture of the brake system.

SUMMARY

An apparatus and method of reducing unwanted brake noise in accordance with this invention is a ring damper that is affixed to a brake drum in a manner that permits relative motion and slippage between the ring damper and the brake drum when the brake drum vibrates during braking. In one preferred embodiment, the ring damper is an almost circular ring that is inserted in a groove formed in the outer periphery of the brake drum. The ring damper can also be a set of rings; a multiple-wrap spiral shaped ring; or a wave shaped ring. The ring damper is held in place by the groove itself and by the interference pre-load or pre-tension between the ring damper and the brake drum.

In a preferred embodiment, the ring damper is pre-loaded against the brake drum both transversely and radially, preferably by means of elastic deformation of the ring damper. In the case where the ring damper comprises multiple damping elements, the damping elements are pre-loaded against each other and the brake drum by elastic deformation of a structural member which also forms one of the damping elements. This renders brake drum-to-damper pre-load insensitive to brake drum and/or damper dimensional variations that arise from thermal expansion and distortion, manufacturing tolerances, and brake drum vibration. In another preferred embodiment where the ring damper is a wave shaped ring, the pre-load is established by elastic deformation of the wave ring, which also provides damping.

BRIEF DESCRIPTION OF THE DRAWINGS

Additional features and advantages of the invention will become apparent to those skilled in the art upon consideration of the following detailed description of a preferred embodiment exemplifying the best mode of carrying out the invention as presently perceived. The detailed description particularly refers to the accompanying figures in which:

FIGS. 4A–4C are cross-section views of ring damper configurations in accordance with this invention for brake drums having no, one and two grooves in which the ring damper is received;

FIGS. 5A–5D are cross-section views of different embodiments of ring dampers according to this invention having rectangular, circular or oval cross-sections;

FIGS. 6A–6C are perspective views of different embodiments of ring dampers according to this invention having single or multiple wraps, and having straight or wave shapes;

FIG. 7 is a perspective view of a wave-shaped ring damper according to this invention located in a groove formed in a drum brake.

DETAILED DESCRIPTION

Figure 1:
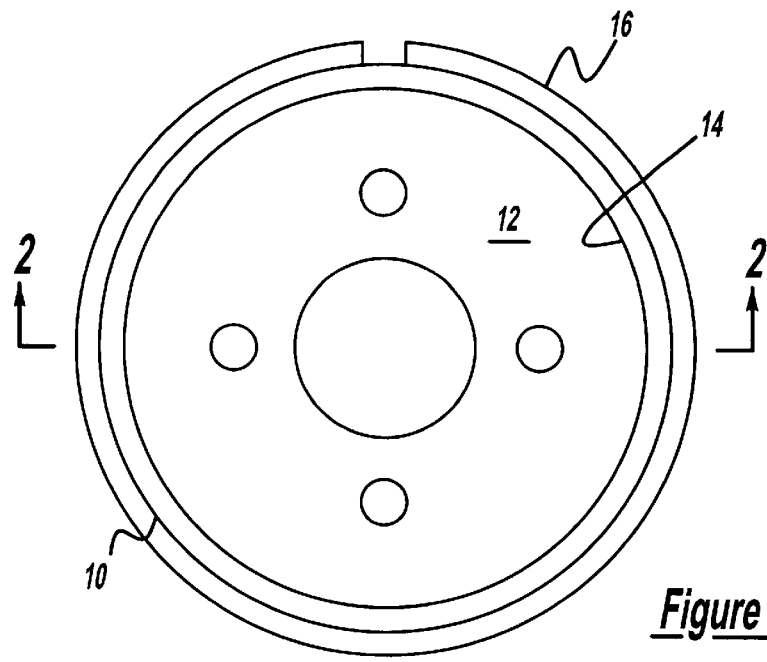
FIG. 1 is a plan view of a brake drum having a ring damper in accordance with this invention.
Figure 2:
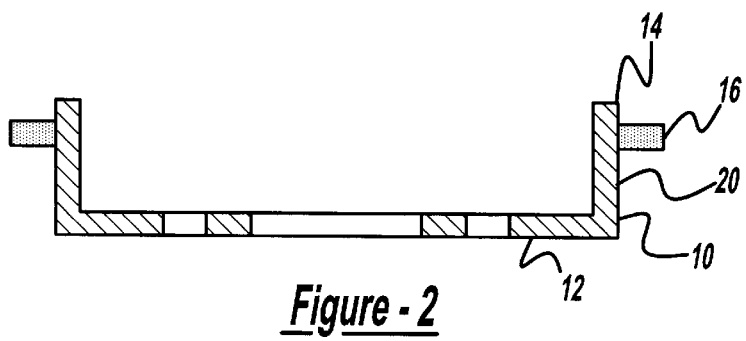
FIG. 2 is a section taken along the line 2—2 of FIG. 1.

Referring to FIGS. 1 and 2, a brake drum 10 has, as is conventional, an annular plate section 12 with a cylindrical or drum portion 14 extending outwardly from the periphery of plate section 12. A damper, such as ring damper 16, extends around an outer perimeter of drum portion 14. In a preferred embodiment, an outwardly opening groove 18 (FIG. 4B) is formed in an outer surface 20 of drum portion 14 and ring damper 16 is received in groove 18 and is held in place by the groove 18 and interference pre-load between the ring damper 16 and drum portion 14. Ring damper 16 in one embodiment is a split ring (FIG. 1).

When brake drum 10 vibrates, there is relative motion and slippage between ring damper 16 and brake drum 10. As a result, vibration energy is damped or dissipated through friction at the ring damper 16 to drum portion 14 interface. The damper of this invention is capable of reducing three-dimensional vibration of the drum—that is, both bending vibration and in-plane vibration. Reduction of both bending and in-plane vibration is believed to be necessary to control the mechanisms for both generation and radiation of squeal noise.

Figure 3:
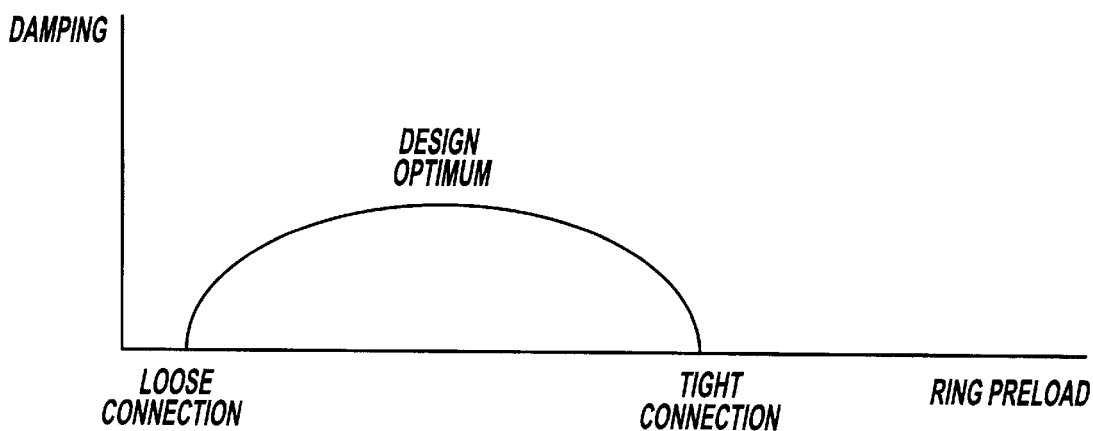
FIG. 3 is a graph showing the relation between damping of brake drum vibration and ring-to-drum pre-load pressure.

It is important that ring damper 16 be affixed to brake drum 10 with the proper pre-loading or pre-tension. Ring damper 16 must be affixed to brake drum 10 with sufficient pre-loading so that it will damp the vibration of brake drum 10 during braking but not so tight that it in effect becomes part of brake drum 10. If ring damper 16 is affixed to brake drum 10 too tightly, it will in effect act as part of brake drum 10 and vibrate with brake drum 10 rather than damp the vibration of brake drum 10. If ring damper 16 is affixed too loosely to brake drum 10, it will not interact with brake drum 10 when rotor 10 vibrates and thus not damp the vibration of brake drum 10. FIG. 3 shows what is believed to be the relationship between the damping provided to the brake drum 10 by ring damper 16 and the initial pre-load developed between ring damper 16 and brake drum 10. By following this relationship, one skilled in the art of brake drum design could heuristically determine the optimal value of the pre-load.

Referring to FIGS. 4A–4C, a ring damper 16 affixed to brake drum 10 according to this invention can include ring damper 16 received on the outer surface 20 of drum portion 14 and encircling, at least in part, the perimeter of drum portion 14 (FIG. 4A); ring damper 16 received in groove 18, as has been described (FIG. 4B); and a plurality of ring dampers 16 received in a plurality of grooves 18 (FIG. 4C).

Referring to FIGS. 5A–5D, the ring damper according to this invention and the outwardly opening groove formed in drum portion 14 can have different cross-sections, such as rectangular, ring 16 and groove 18 shown in FIG. 5A, circular, such as ring 22 and groove 24 shown in FIG. 5B or oval, such as ring 31 and groove 32 shown in FIG. 5E. The ring damper according to this invention can also comprise a single ring, such as rings 16, 22 and 31 shown in FIGS. 5A, 5B 5E, or multiple rings, such as rings 28 and 30 shown in FIGS. 5C and 5D.

Figure 8:
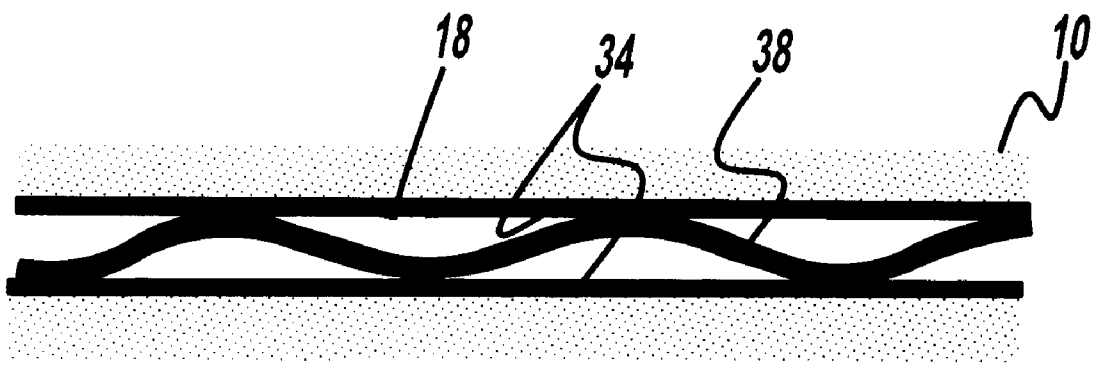
FIG. 8 is a perspective view of a ring damper according to this invention comprising a wave-shaped ring damper and with two adjacent straight ring dampers located in a groove formed in a brake drum.

Referring to FIGS. 6A–6C, the ring damper according to this invention can comprise a single wrap ring 34 (FIG. 6A), a multiple wrap ring 36 (FIG. 6B), or a wave shaped ring 38 (FIG. 6C). FIG. 7 shows wave shaped ring 38 in groove 18 in drum 10. FIG. 8 shows wave shaped ring 38 in groove 18 in drum 10 along with adjacent straight rings, such as ring 34.

With reference to multiple ring embodiments, such as shown in FIGS. 5C, 5E and 8, one of the multiple rings is preferably shaped so that when it is received in the groove 18, it elastically deforms to pre-load the multiple rings against each other and the drum.

The optimum number and location of ring dampers 16 used, the pre-loading of each, the shape of the cross-section of ring damper 16, the number of wraps around the drum for the multiple wrap embodiment (FIGS. 5C and 5D), the shape of groove 18, the surface treatment of ring damper 16 and groove 18 to establish functional characteristics, and the material used can be determined heuristically for each type of brake drum by one skilled in the art of brake design to optimize the damping of brake noise and vibration.

Although the invention has been described in detail with reference to certain preferred embodiments and specific examples, variations and modifications exist within the scope and spirit of the invention as defined in the following claims.

What is claimed is:

1. A brake drum having a ring damper around a periphery of the brake drum that is pre-loaded against the drum both transversely and radially and affixed such that said ring damper moves and slips between the ring damper and the brake drum when the brake drum vibrates during braking to damp brake noise.

2. The apparatus of claim 1 wherein the brake drum has a groove formed therein, the ring damper received in the groove and held therein by the groove and pre-loading between the ring damper and the brake drum.

3. The apparatus of claim 2 wherein the ring damper comprises a split ring.

4. The apparatus of claim 2 wherein the ring damper is formed in a wave pattern around the periphery of the brake drum.

5. The apparatus of claim 2 wherein the ring damper comprises multiple wraps of wire around the periphery of the brake drum.

6. The apparatus of claim 2 wherein the ring damper has a rectangular cross-section.

7. The apparatus of claim 2 wherein the ring damper has an oval cross-section.

8. The apparatus of claim 2 wherein the ring damper has a circular cross-section.

9. The apparatus of claim 2 wherein the brake drum has the groove formed in its periphery.

10. The apparatus of claim 2 wherein the ring damper comprises first and second opposed straight rings and a wave-shaped ring sandwiched therebetween, the first and second opposed rings and wave-shaped ring pre-loaded against each other and transversely and radially against the drum by elastic deformation of the wave-shaped ring.

11. The apparatus of claim 2 wherein the ring damper comprises multiple rings, at least one of the multiple rings shaped so that when it is received in the groove with the other rings it elastically deforms to pre-load the multiple rings against each other and the drum.

* * * * *